Feb. 23, 1937.  E. A. SIGG  2,071,475

COUPLING FOR A FLYWHEEL

Filed April 9, 1936  5 Sheets-Sheet 1

Inventor
E. A. Sigg

By Clarence A. O'Brien and
Hyman Berman
Attorneys

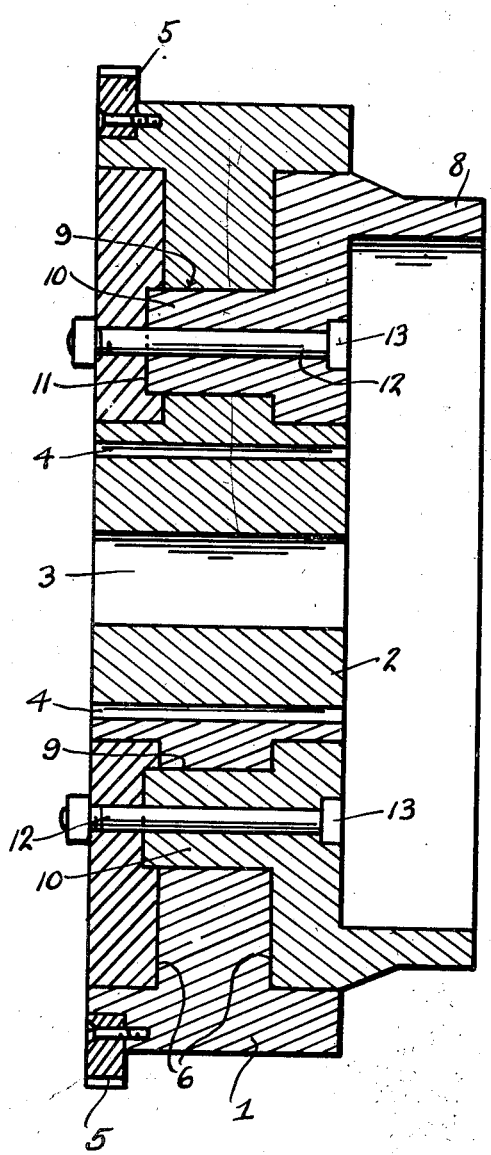
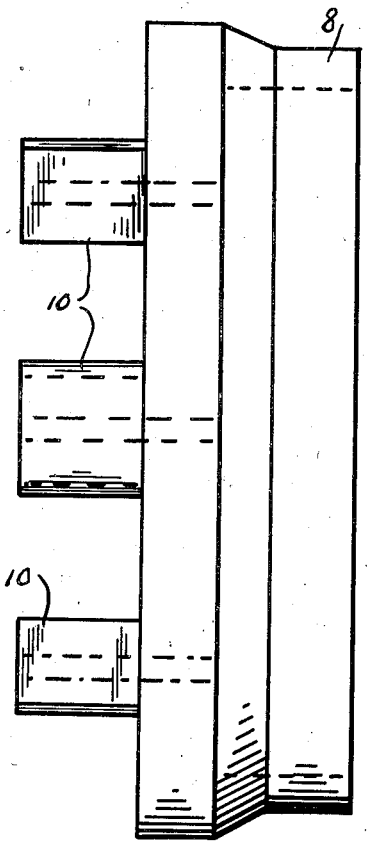

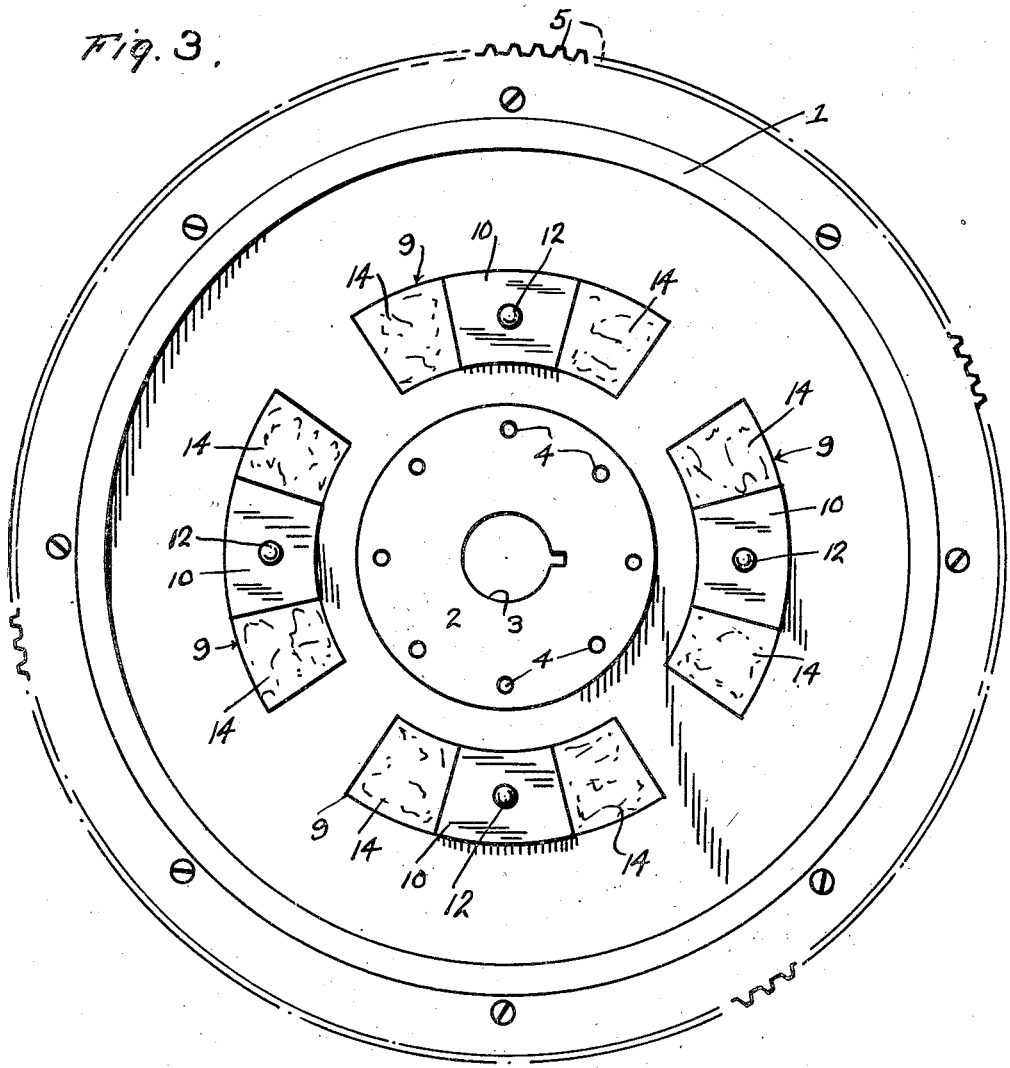
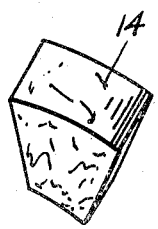

Feb. 23, 1937.  E. A. SIGG  2,071,475
COUPLING FOR A FLYWHEEL
Filed April 9, 1936   5 Sheets-Sheet 5

Inventor
E. A. Sigg

Patented Feb. 23, 1937

2,071,475

UNITED STATES PATENT OFFICE 2,071,475

COUPLING FOR A FLYWHEEL

Emil A. Sigg, Sherwood, Ohio

Application April 9, 1936, Serial No. 73,522

2 Claims. (Cl. 64—27)

The present invention relates to new and useful improvements in flywheels particularly for various types of internal combustion engines, although it will be understood, of course, that a flywheel constructed in accordance with the present invention may be used for any purpose for which it may be found adapted and desirable.

The primary object of the invention is to provide, in a manner as hereinafter set forth, a flywheel of the aforementioned character embodying a novel construction, combination and arrangement of parts through the medium of which substantially all shock and vibration from the engine will be materially reduced or eliminated, thus promoting efficiency in general as well as prolonging the life of the engine and the mechanism driven thereby.

Other objects of the invention are to provide a yielding or cushioned flywheel of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view in vertical section through the invention, taken substantially on the line 2—2 of Figure 1.

Figure 3 is a view in front elevation of the invention with the ring constituting an important part of the device omitted.

Figure 5 is a view in side elevation of the clutch member.

Figure 9 is a detail view in perspective of one of the cushions.

Figure 1:
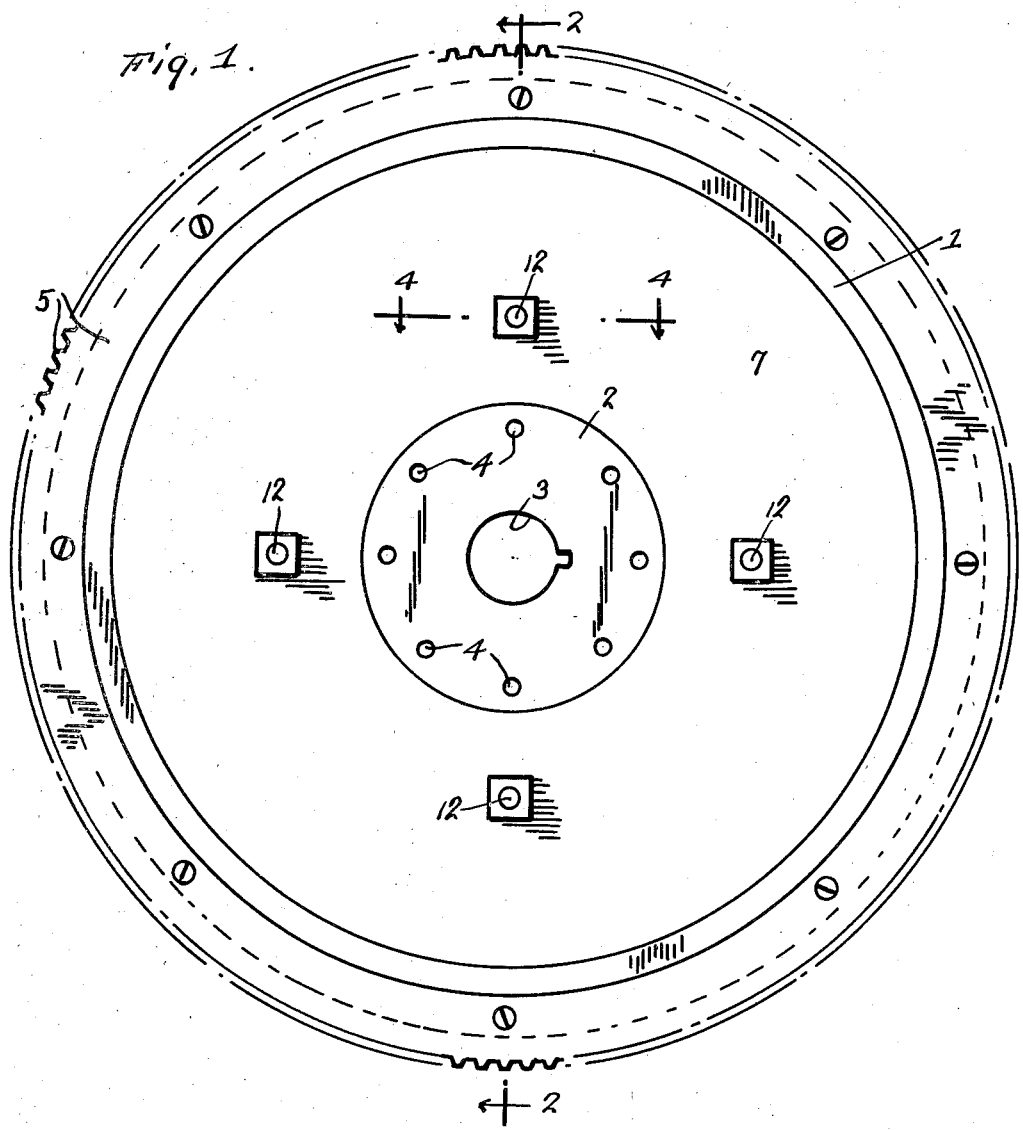
Figure 1 is a view in front elevation of a cushioned flywheel constructed in accordance with the present invention.
Figure 4:
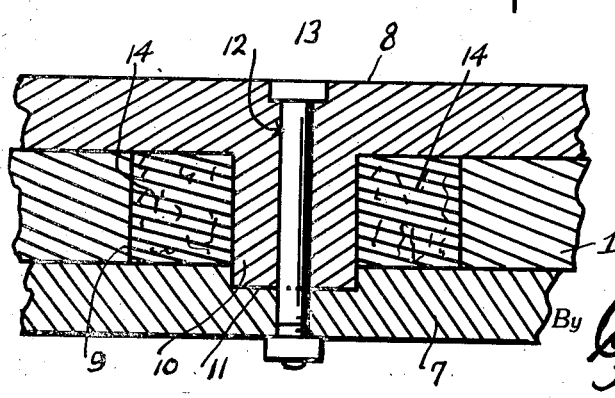
Figure 4 is a fragmentary view in horizontal section, taken substantially on the line 4—4 of Figure 1.

Referring now to the drawings in detail, it will be seen that the embodiment of the invention which has been illustrated in Figures 1 to 9, inclusive, comprises a wheel 1 of suitable material and dimensions which includes a hub portion 2 provided with a central bore 3. The hub portion 2 further includes a plurality of openings 4 which are concentric with the bore 3 for receiving attaching bolts (not shown) for securing the flywheel to the crankshaft of an engine in any suitable manner. The reference numeral 5 designates a starter gear which is recessed in and secured to the periphery of the wheel 1 at the forward end thereof.

Figure 6:
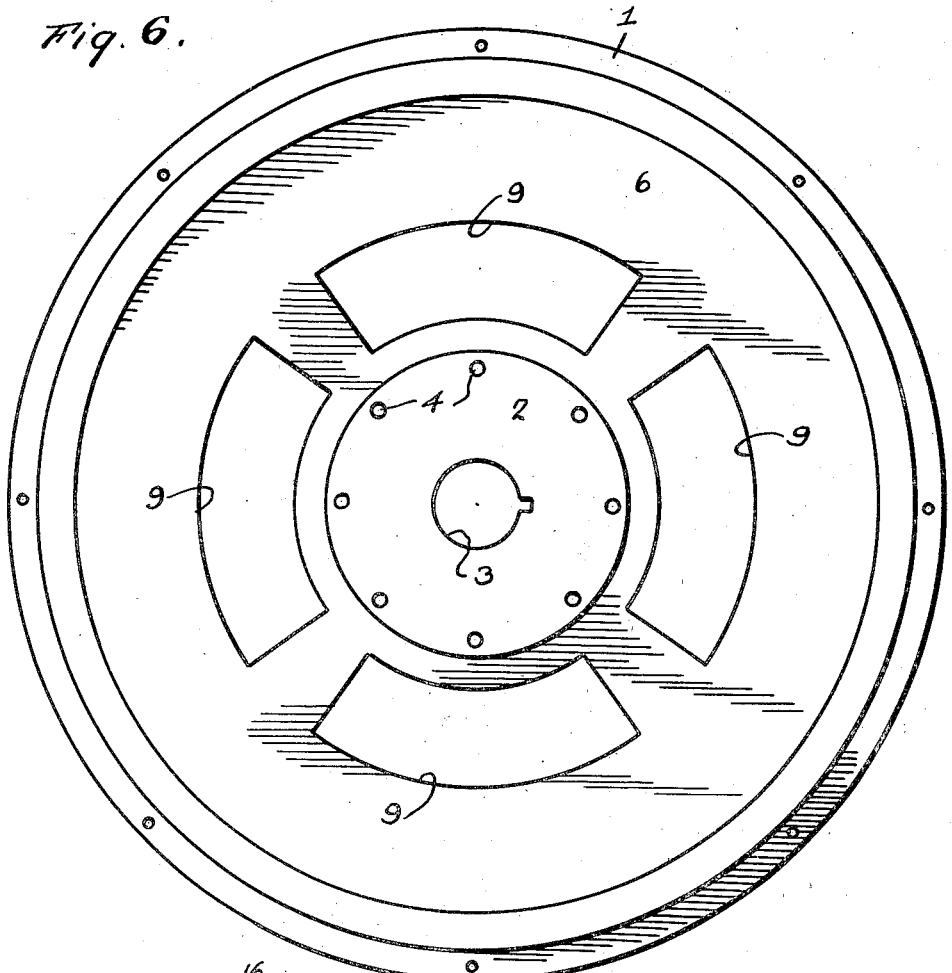
Figure 6 is a detail view in front elevation of the driving member or wheel.

The wheel 1 has formed in its opposite faces annular channels 6 for the reception of a ring 7 and a clutch member 8. It may be well to here state that the elements 7 and 8, when the invention is assembled and in operation, are capable of rotary movement relative to the wheel 1. As best seen in Figure 6 of the drawings, the wheel 1 has formed therein, adjacent the hub portion 2, a plurality of concentric, arcuate slots 9 which communicate with the annular channels 6. Operable in the slots 9 are substantially segmental lugs 10 which are integral with the clutch member 8. The free end portions of the lugs 10 are engaged in substantially segmental sockets 11 (see Figure 7) which are provided therefor in the inner face of the ring 10. It will thus be seen that the ring 7 and clutch member 8 are positively secured together for rotation in unison. Bolts 12 pass through the clutch member 8, the lugs 10 and the ring 7 for securing said ring 7 and said clutch member 8 in position on the wheel 1. It will be observed that the heads 13 of the bolts 12 are countersunk in the clutch member 8. Mounted in the slots 9 on opposite sides of the lugs 10 are substantially segmental resilient rubber blocks 14.

It is thought that the operation of the invention will be readily apparent. The clutch member 8 is driven by the wheel 1 through the resilient blocks 14. Thus, substantially all strains, shocks and vibration, instead of being transmitted to the clutch member 8, the transmission and drive shaft, etc. of the automobile will be absorbed by the cushions 14. The lugs 10 are of a length to permit the bolts 12 to be drawn up tightly without binding the ring 7 and the clutch member 8 to the wheel 1. As hereinbefore stated, the engagement of the lugs 10 in the sockets 11 positively secure the elements 7 and 8 against relative rotary movement and this constitutes an important feature of the invention.

Figure 10:
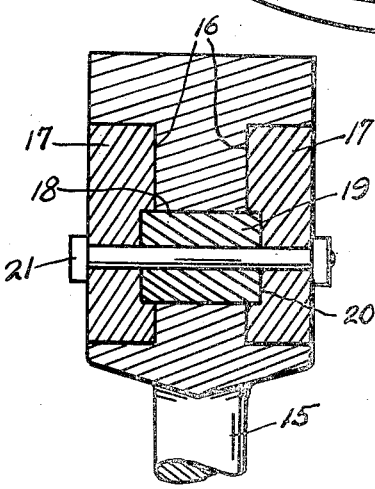
Figure 10 is a fragmentary view in vertical section through a slightly modified form of the invention.
Figure 7:
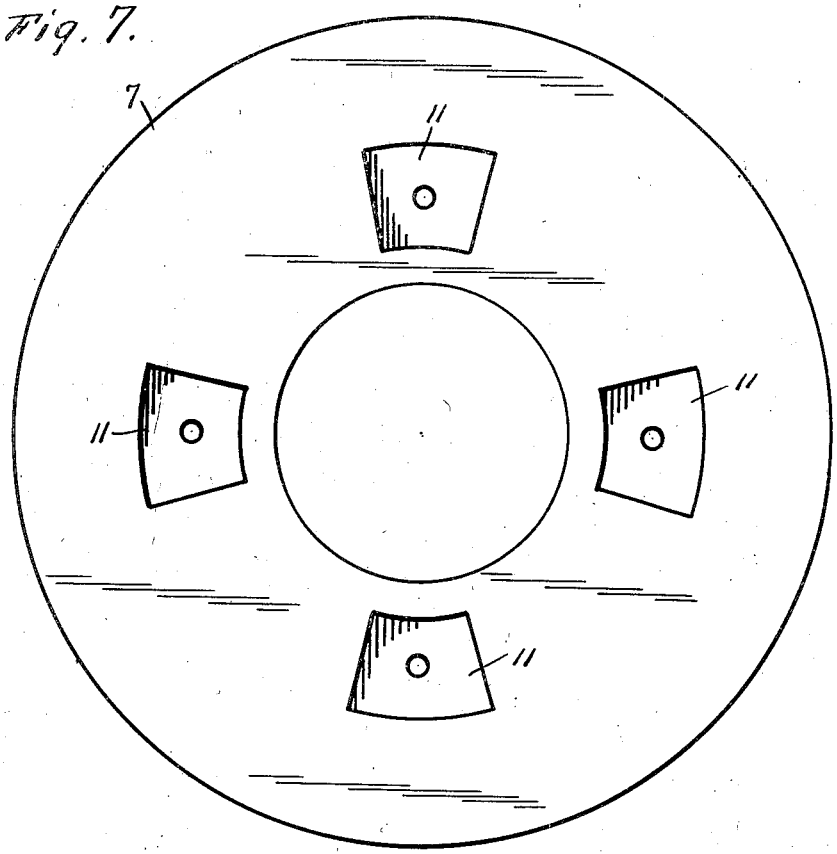
Figure 7 is a detail view in rear elevation of the ring.
Figure 8:
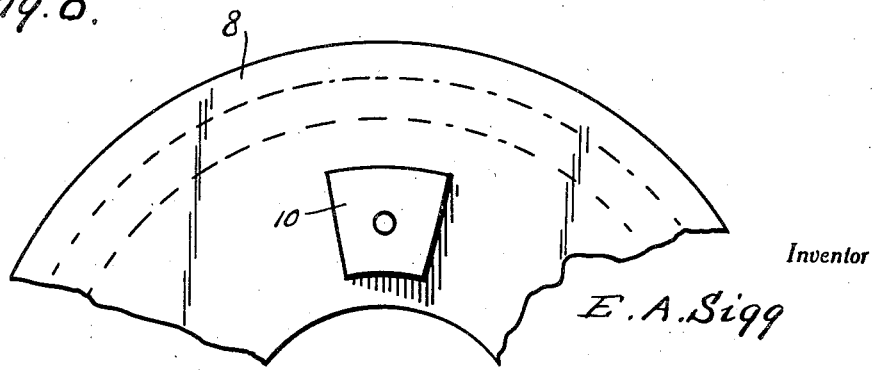
Figure 8 is a fragmentary view in front elevation of the clutch member.

The modification shown in Figure 10 of the drawings may be used for stationary engines and includes a wheel of the spoke type 15 having formed in the opposite faces or sides of its outer portion annular grooves 16 for the reception of rings 17. Establishing communication between the grooves or channels 16 are arcuate slots 18 which accommodate slidable elements 19. The elements 19 function in a manner similar to the lugs 10 and are mounted between pairs of resilient rubber blocks, similar to the blocks 14, in the slots 18. The end portions of the elements 19 are engaged in sockets 20 which are provided therefor in the inner faces of the rings 17. Bolts 21 pass through the rings 17 and the elements 19 for securing said rings and elements in assembled relation on the wheel 15. The operation of this embodiment of the invention is substantially similar to that illustrated in the other figures.

It is believed that the many advantages of a flywheel constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:—

1. A coupling for a flywheel of the class described comprising a wheel member having annular channels in opposite sides thereof and further having arcuate slots therein establishing communication between the channels, a ring rotatably mounted in one of the channels, said ring having a plurality of sockets in its inner face, a clutch member rotatably mounted in the other channel, lugs integral with the clutch member and operable in the slots, the free end portions of said lugs being engaged in the sockets, bolts extending between the ring and the clutch member for rotatably securing said ring and clutch member in the channels, and resilient elements mounted in the slots on opposite sides of the lugs for yieldingly resisting relative rotary movement between the wheel member and the clutch member.

2. A coupling for a flywheel of the class described comprising a wheel member having annular channels in opposite sides thereof and further having arcuate slots therein establishing communication between the channels, a gear mounted on the periphery of the wheel, a ring rotatably mounted in one of the channels, said ring having a concentric series of substantially segmental sockets in its inner face aligned with the slots, a clutch member rotatably mounted in the other channel, spacing elements integral with said clutch member and operable in the slots, said spacing elements having their free end portions engaged in the sockets, said spacing elements being substantially segmental in cross section, securing bolts extending through the clutch member, the spacing elements and the ring, and resilient blocks mounted in the slots on opposite sides of the spacing elements for yieldingly resisting relative rotary movement between the wheel member and the clutch member.

EMIL A. SIGG.